United States Patent [19]

Brubaker et al.

[11] Patent Number: 4,625,922
[45] Date of Patent: Dec. 2, 1986

[54] ELEVATED TEMPERATURE COMMINUTION OF VULCANIZED RUBBER AND OTHER ELASTOMERS

[75] Inventors: Ronald L. Brubaker, Hudson; Robert Calevich, Richmond Heights, both of Ohio

[73] Assignee: The Goodyear Tire & Rubber Company, Akron, Ohio

[21] Appl. No.: 688,959

[22] Filed: Jan. 4, 1985

[51] Int. Cl.⁴ .............................................. B02C 19/12
[52] U.S. Cl. ........................................ 241/17; 241/21; 241/23; 241/DIG. 31
[58] Field of Search ................... 241/17, 21, 23, 24, 241/35, DIG. 31, 261.2, 261.3, 248, 245, 65, 66, 101 B, 46.06

[56] References Cited

U.S. PATENT DOCUMENTS

| | | | |
|---|---|---|---|
| 2,211,518 | 8/1940 | Scherbaum | 241/66 |
| 2,560,807 | 7/1951 | Lobo | 241/21 X |
| 2,833,483 | 5/1958 | China | 241/37 |
| 2,909,332 | 10/1959 | Brown et al. | 241/46 |
| 4,383,650 | 5/1983 | Contal et al. | 241/66 |
| 4,394,977 | 7/1983 | Mijala | 241/21 |
| 4,469,284 | 9/1984 | Brubaker et al. | 241/25 TR |

FOREIGN PATENT DOCUMENTS 2316389  10/1974  Fed. Rep. of Germany .

*Primary Examiner*—Mark Rosenbaum
*Attorney, Agent, or Firm*—Fay & Sharp

[57] ABSTRACT

A slurry pump (40) pumps a slurry of vulcanized rubber pellets and water from a slurry mixing region (30) to a mill (B). The slurry passes through a comminuting zone (80) defined between an abrasive stator (66) and an abrasive rotor (76). As the slurry is comminuted in the comminuting zone, heat is generated, which heat is absorbed by at least the water. The comminuted rubber particles and water pass from the mill to a separator (C) which separates the rubber particles from the heated water. The heated water is conveyed to a hot water reservoir (24) from which it is recirculated to the slurry mixing region. Additional pellets from a pellet supply (10) are fed to the mixing region to be mixed with the recirculated heated water. In this manner, the slurry is preheated above room temperature prior to comminution. It has been found that increasing the water temperature to about 130° F. rather than using city water of about 55° F., increases the production rate of the mill by about 20 to 25 percent.

9 Claims, 2 Drawing Figures

ELEVATED TEMPERATURE COMMINUTION OF VULCANIZED RUBBER AND OTHER ELASTOMERS

BACKGROUND OF THE INVENTION

The present invention relates to the comminution and grinding arts. It finds particular application in comminuting one centimeter sized vulcanized rubber pellets to micron sized particles in a single pass and will be described with particular reference thereto. It is to be appreciated, however, that the invention may find other applications in the comminution or size reduction of other solid materials such as synthetic and natural elastomers, plastics, coal, resins, and the like.

Heretofore, it has been found that micron-sized vulcanized rubber particles could be added to virgin rubber without adversely affecting its properties. Various methods and apparatus have been implemented to reduce vulcanized rubber and other elastomeric materials to micron-size particles.

As rubber becomes warmer, it tends to become more gummy or sticky. Whereas, when rubber is cooled it tends to become more brittle. To facilitate the reduction of rubber to smaller sized particles, the rubber was commonly cooled to a stiffer or more brittle state.

In one common method for reducing rubber to small particles, larger pieces of rubber were cooled to a cryogenic temperature at which the rubber behaved analogous to a brittle solid. The cryogenically cooled, embrittled rubber particles were ground with conventional grinding techniques. However, during the grinding, the temperature of the particles was raised above the cryogenic temperatures. The warming required that the particles be re-frozen and reground one or more times to reach micron-size.

Others have used cutting and abrasion devices for reducing the particle size of rubber. However, significant increases in the temperature of rubber from the heat generated in comminution were found to revert the rubber to a gummy or sticky state. The warm, gummy rubber tended to clog the pores or cutting surfaces of the abrasion and cutting devices. The warm, gummy rubber further provided increased resistance to moving comminution surfaces. The increased power required to move the abrading and cutting surfaces through the warm, gummy rubber tended to overload the comminution apparatus. Moreover, rubber is a combustible material and the hazard of combustion increases with increased temperature. The elevated temperatures generated in abrading and cutting tended to degrade the processed rubber material rendering it more combustible. Accordingly, the rubber material and the comminuting apparatus were commonly cooled. Efforts were made to maintain the temperature of the rubber to be comminuted and the abrading or cutting surfaces as cool as economically feasible.

The inventors herein have, contrary to the generally accepted wisdom, reduced the amount of cooling by increasing the temperature of a rubber and fluid slurry prior to comminution. The warmer temperatures are sufficient to reduce the viscosity of the carrier fluid without reverting the rubber to a gummy consistency. In this manner, they have achieved an increase in the comminution rate of up to 25 percent and more.

SUMMARY OF THE INVENTION

In accordance with one aspect of the present invention, an improved method of comminuting pellets is provided. The vicosity of a fluid is reduced, such as by heating it above room temperature, and the reduced viscosity fluid mixed with pellets to provide a slurry. The pellets are comminuted to fine particles by passing the slurry through a comminuting zone.

In accordance with another aspect of the present invention, a recirculating fluid comminuting method is provided. Pellets are comminuted by passing a slurry of the pellets and the fluid through a comminuting zone to comminute the pellets to fine particles. Comminution of the pellets normally generates heat, which heat is absorbed by the fluid and particles. The fine particles are separated from the fluid. The separated fluid is then remixed with additional pellets to provide additional slurry and is returned to the comminuting step. In this manner, the heat inherently generated during comminution is captured by the recirculating fluid and may be used to preheat the slurry before subsequent pellet comminuting.

In accordance with another aspect of the present invention, a comminuting apparatus is provided. A mixing region is provided in which pellets and a fluid are mixed to form a slurry. A comminuting zone for comminuting pellets into fine particles is connected with the mixing region to receive the slurry therefrom. As pellets are comminuted in the comminuting zone, heat is generated which is absorbed by the fluid. A separating means separates the heated fluid from the fine particles. The separating means is operatively connected with the mixing region to return the heated fluid thereto. In this manner, the comminuting apparatus improves operating efficiency by preheating the slurry prior to comminution and by conserving and reusing the fluid.

BRIEF DESCRIPTION OF THE DRAWINGS

The invention may take form in various parts and arrangements of parts or in various steps and arrangements of steps. The drawings are only for purposes of illustrating a preferred embodiment for carrying out the present invention and are not to be construed as limiting it. Wherein the figures show.

DETAILED DESCRIPTION OF THE PREFERRED EMBODIMENT

Figure 1:
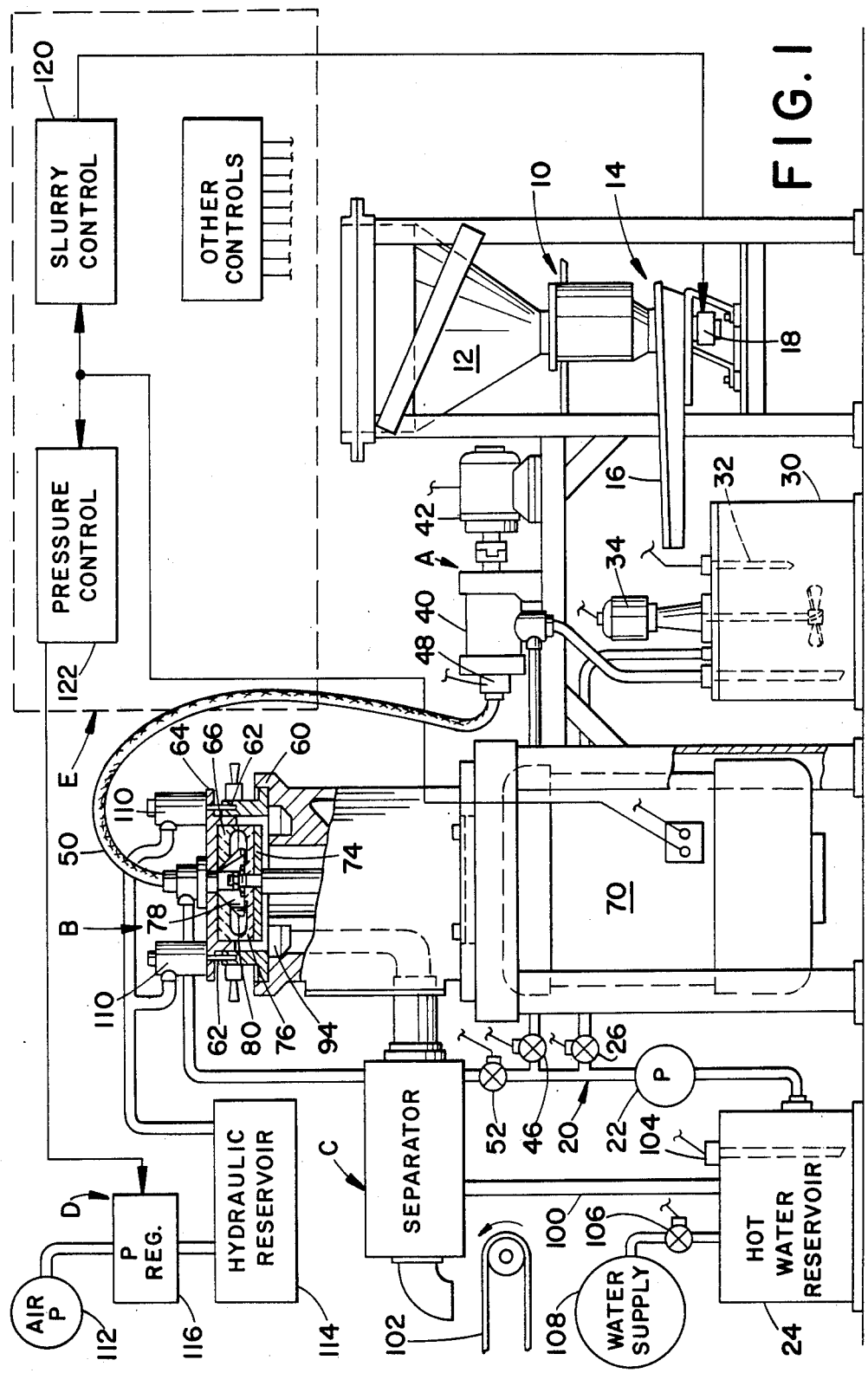
FIG. 1 is a diagrammatic view of a comminuting apparatus in accordance with the present invention; and, FIG. 2 is an enlarged view of the comminuting zone of FIG. 1.

With reference to FIG. 1, a slurry feeding means A feeds a slurry of fluid and pellets of vulcanized rubber or other materials to be comminuted to a mill B. In the mill, the slurry is passed through a grinding or comminuting zone in which a combination of pressure and relative movement divides pellets primarily into fine, micron-sized particles in a single pass. During the comminution, significant amounts of heat are generated which heat is absorbed by the fluid. In this manner, the mill B also functions as a means for heating the fluid. A separating means C separates the comminuted particles from the hot fluid which is recirculated back to the slurry feeding means A. A pressure regulating means or assembly D adjusts the pressure in the comminuting zone. An electrical control system or means E selectively monitors operating conditions at various points in the slurry feeding means A and the mill B in order to control the operating parameters.

The slurry feeding means A includes a pellet feeding means 10 for supplying pellets of vulcanized rubber, plastics, synthetic rubber, other elastomers, coal, or the like at a selectable rate. The pellet feeding means includes a pellet hopper 12 which discharges the pellets into a vibratory feeder 14. The vibratory feeder includes a generally horizontal trough 16 which is vibrated by a motor 18 whose vibrational frequency or duty cycle controls the pellet feed rate.

A fluid or water feeding means 20 supplies heated water or other fluid which is to be combined with the pellets to form the slurry. A water pump 22 supplies water from a hot fluid or water reservoir 24 through a control valve 26 to a fluid and pellet mixing region, such as a slurry reservoir 30. A water level control probe or sensor 32 senses the level of water in the slurry reservoir. The control means E monitors the sensed water level and controls operation of the water supply valve 26 such that the fluid level in the slurry reservoir 30 is held substantially constant.

An agitator 34 mixes the pellets and liquid in the slurry supply reservoir to maintain the pellets suspended in the water. The agitation assists in achieving and maintaining thermal equilibrium between the pellets and the fluid and serves to maintain the pellets uniformily distributed in the fluid.

In the preferred embodiment, the pellets and fluid are mixed to form a slurry and the slurry is supplied to the mill. Optionally, the fluid and pellets could each be supplied to the mill separately in coordination such that the slurry is formed in the mill itself.

A pump 40, such as a positive displacement pump, pumps the slurry from the slurry reservoir 30 to the mill B. A slurry feed motor 42 selectively controls the speed, hence, the feed rate of the positive displacement pump 40. A pump priming valve 46 is selectively actuated by control means E to prime the slurry pump 40. A slurry pump back pressure sensing switch 48 is provided for sensing the pressure of the slurry at the output of the slurry pump and provide an indication of the presence thereof to the control system E.

A slurry feed line 50 is of appropriate diameter relative to the slurry feed rate that the slurry is fed at a velocity which maintains the pellets suspended in the fluid. At the inlet of the mill B, a flow monitoring means, such as an ultrasonic sensor, may sense the flow rate of slurry into the mill and the comminuting zone. The slurry feed rate may be communcated to the control system E for use in controlling various system parameters, particularly the pumping rate of the slurry feed pump 40. A supplemental or emergency water feed valve 52 is selectively activated by the control system E to assure that water is provided to the comminuting zone. The supplemental water feed valve may be opened if the control system E determines that the comminuting zone is starved for fluid, e.g. by a failure of the slurry pump 40.

Figure 2:
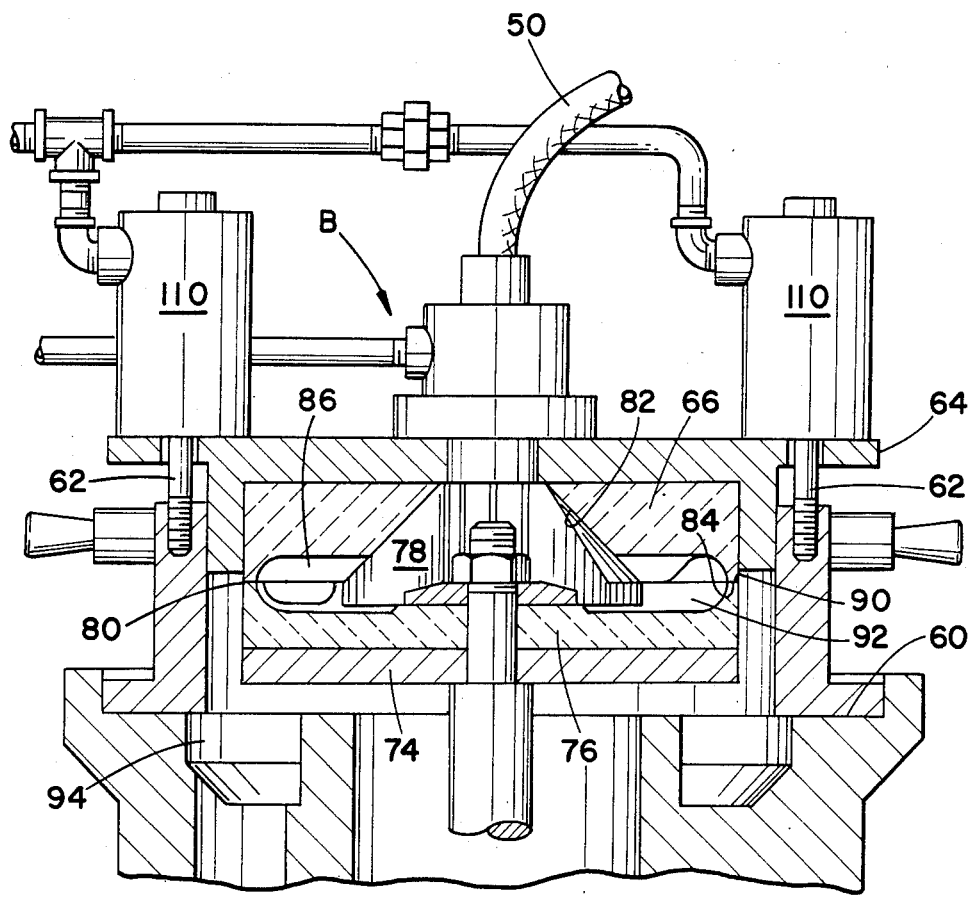

With continuing reference to FIG. 1 and secondary reference to FIG. 2, the mill B includes a mill housing 60 upon which a plurality of upward extending posts 62 are mounted. A stator mounting bracket 64 in which a stator 66 is mounted is slidably disposed on the posts 62 for longitudinal, but not rotational movement relative thereto.

A mill or rotor motor 70, such as a 100 hp motor, is mounted in the mill housing 60. The mill motor is connected with a rotor support plate 74 and a rotor 76. A central portion of the rotor and stator define a fluid receiving region for receiving the pellet and fluid slurry. An impeller 78 is connected with the rotor and disposed in the receiving region to urge the pellets into the comminuting zone 80 defined between abutting surfaces of the rotor and stator.

The slurry receiving region is defined in part by a stator abrasive surface 82. A generally peripheral stator abrasive surface 84 surrounds the receiving region and in part defines the comminuting zone 80. The stator receiving region abrasive surface 82 contacts the impeller 78 such that the impeller is ground thereby. As the rotor and stator wear, the impeller is ground to maintain intimate physical contact with the stator to urge the slurry more forcefully into the comminuting zone. The stator peripheral abrasive surface 84 defines a plurality of stator recesses 86 which provide fluid communication between the slurry receiving region and the comminuting zone 80. In the preferred embodiment, each stator recess extends generally radially from the slurry receiving region and terminates in a cam surface within the comminuting zone.

The rotor 76 includes a rotor peripheral abrasive surface 90 which defines a plurality of rotor recesses 92 therein. The rotor peripheral abrasive surface 90 interacts with the stator peripheral abrasive surface 84 to define the comminuting zone 80 therebetween. The rotor recesses 92 extend from the slurry receiving region into the comminuting zone to facilitate movement of the pellets between the receiving region and the comminuting zone.

In the preferred embodiment, the rotor and stator are constructed of abrasive compositions which have a median pore size in the range of 10–200 microns and interconnected porosity. A pore size of 50 microns has been found effective for comminuting vulcanized rubber to particles having by weight a medium diameter of 50 microns. By number 90 percent of the particles have a diameter of less than 20 microns. In one preferred embodiment, the rotor and stator are constructed of aluminum oxide with a grit size of about 46 mesh, but silicon and other grits in a range of about 20–100 mesh are contemplated. Preferably, the abrasive grits are vitreous bonded with about 22 percent glass by weight, although resin bonding and other bonding techniques may be utilized. To provide a relatively long life, the rotor and stator are a I hardness or higher, with T hardness being preferred.

In operation, the impeller 78 urges the pellets and the water from the receiving region into the rotor recesses. Within the rotor recesses, centrifugal force urges the pellets toward the comminuting zone with the highest pressure being developed at the radially outward end of each rotor recess 92. When a rotor recess aligns with a stator recess 86, the stator recess provides a path to lower pressure in the receiving region. This pressure differential allows pellets and fluid to flow from the rotor recess to the stator recess and back into the slurry receiving region. This creates a turbulence which maintains the pellets suspended in the water.

Pellets tend to become wedged into the comminuting zone as the rotor and stator recesses move out of alignment. With continued rotation of the rotor relative to the stator, the pellets are stretched and wedged between the stator and rotor peripheral abrasive surfaces 84, 90.

The pores and grit of the abrasive surfaces comminute the pellets of rubber into progressively smaller particles as the rubber moves spirally outward through the comminuting zone. In a 10 inch rotor and stator combination, it has been found that the comminution of the rubber generates sufficient heat to raise the temperature of the water about 60° F.

The micron sized particles and the heated water are collected in a trough 94 and conveyed to the separator C. The separating means C may include a centrifugal separator, or other known apparatus, for separating liquids from fine solids. A warm water line 100 conveys the heated fluid or water separated by the separating means to the hot water reservoir 24 to be returned, as needed, to the slurry reservoir 30. The micron sized rubber particles are deposited on a conveying means 102 to be conveyed to equipment for drying the particles more completely or other processing as may be appropriate. To replace water or fluid retained by the particles, the control system E with a probe 104 monitors the hot water or fluid in the reservoir 24 and selectively operates a valve 106 connected with a fluid or water supply 108, such as a city water system.

As the pellets are fed into the comminuted zone, the pressure regulator assembly D selectively controls the force or pressure between the rotor and stator with a plurality of fluid cylinders 110. When comminuting vulcanized rubber between a 10 inch rotor and stator, a load of 2,000-10,000 lbs. has been found to produce satisfactory results, with about 3,700-4,000 lbs. being preferred. A source 112 of pressurized air or other gas, such as a compressor, selectively pressurizes a hydraulic reservoir 114. A hydraulic fluid pressure regulating means 116 selectively controls the pressure of hydraulic fluid supplied from the hydraulic reservoir 114 to the hydraulic cylinders 110. In the preferred embodiment, the pressure regulator selectively adjusts the amount of air pressure applied to the hydraulic fluid in the reservoir.

The control circuit E includes a slurry control circuit 120 for controlling the concentration of pellets in the slurry and a pressure control circuit 122 for controlling the pressure between the rotor and stator. The slurry control circuit gradually increases the pellet concentration in the slurry during start-up and maintains the pellet concentration during steady state operations.

During start-up, the slurry control circuit 120 compares the actual electrical power or wattage drawn by the mill motor 70 with a slurry set point wattage. When the actual wattage is well below the slurry set point, the slurry control circuit causes the pellet feeding means 10 to feed pellets to the mixing tank 30 relatively rapidly. As the concentration of pellets in the slurry increases, the power drawn by the mill motor increases. As the power drawn by the mill motor approaches the slurry power set point, the slurry control circuit causes the pellet feeding means to feed the pellets into the mixing tank more slowly. Equilibrium is achieved at the pellet feed rate which maintains the pellet concentration in the slurry at the concentration that causes the mill motor to draw power at the slurry power set point.

During steady state operations, adjustments to the pellet feed rate may be required to maintain the actual power drawn by the mill motor at the slurry set point. When the actual power drawn exceeds the slurry set point, the feed of pellets is stopped. As the concentration of pellets in the slurry decreases, the actual power drawn decreases to the slurry set point and the feeding of pellets into the mixing tank is recommenced. When the actual power drawn by the mill motor decreases, the pellet feed rate is increased to increase the pellet concentration. In this manner, the slurry control circuit adjusts the pellet feed rate, hence the pellet concentration, such that the power drawn by the mill motor is maintained substantially at the preselected set point.

The pressure control circuit 122 includes a pressure adjusting means for causing adjustment of the force with which the pressure regulator assembly D urges the rotor and stator together. The pressure control circuit initially causes the rotor and stator to be held together with a preselected force. In response to potential overload conditions, the pressure control circuit selectively reduces the pressure. First, the pressure control circuit compares the power or wattage drawn by the mill motor with a preselected pressure set point wattage. In the preferred embodiment, the pressure set point is at a higher wattage than the slurry set point. In response to the drawn power exceeding the pressure set point, the pressure control circuit causes the pressure regulator 116 to reduce the force with which rotor and stator are urged together. Second, the pressure control circuit compares the back pressure monitored by slurry pump sensing switch 48 with a back pressure set point. In response to the monitored back pressure exceeding the back pressure set point, the pressure control circuit causes the pressure regulator assembly D to decrease the force with which the rotor and stator are urged together.

As the slurry moves through the comminuting zone, its temperature is significantly increased in the preferred embodiment about 60° F. Some of the heat from the water is lost into the ambient atmosphere, the surrounding equipment, the rubber particles, and the like. Further cooling results from the addition of water to replace evaporated or lost water, from the addition of relatively cool rubber pellets, and the like. Accordingly, the temperature of the slurry entering the grinding zone varies with the exact equipment, reservoir sizes, ambient atmospheric temperature, and the like. In the preferred embodiment, steady state, thermal equilibrium has been obtained with a slurry, particularly the water therein, at about 130° F. at the entrance to the comminuting zone. In test runs under the same mill operating conditions, 1000 lb. batches of vulcanized rubber pellets from the same lot have been comminued with the slurry at about 53° F. and at about 130° F. About 25 percent more time was required to comminute the 1000 lb. batch at 53° F. than the 1000 lb. batch at 130° F. In a longer term test, the same mills have been run for six weeks on recirculated water at an elevated temperature and for six weeks on cooler city water. With the recirculated warm water, the mills ground more than 20 percent more rubber than on the cooler city water. In this manner, the present inventors have achieved 20 to 25 percent greater throughput by increasing the slurry temperature above room temperature prior to comminution.

The lower viscosity of water at elevated temperatures contributes to the improved efficiency. The absolute viscosity of 130° F. water is about 60% less than the absolute viscosity of water at 50° F. This reduction in viscosity reduces the energy required of the mill motor to shear the water. Other substances which reduce the water viscosity may also improve productivity.

Although excellent results have been achieved and documented with the water entering the comminuting zone at about 130° F., other elevated temperatures are also advantageous. In the preferred embodiment, about a 60° F. increase in water temperature occurs in the grinding zone. Slurry temperatures above room temperature, e.g. above about 80° F., up to about the boiling point of the fluid are preferred. The maximum slurry temperature, of course, is higher for fluids with a higher boiling point but should be low enough that the rubber does not revert to a gummy consistancy. Because the water is in large part recirculated, various surfactants which both decrease the viscosity of the water and increase the boiling point may be added.

The invention has been described with reference to the preferred embodiment. Obviously, modifications and alterations will occur to others upon reading and understanding the preceeding detailed description. It is intended that the invention be construed as including all such alterations and modifications in so far as they come within the scope of the appended claims or the equivalents thereof.

Having thus described the preferred embodiment, the invention is now claimed to be:

1. A method of comminuting pellets to micron range particles, the method comprising:
    pumping a slurry of liquid and pellets to be comminuted to a comminuting zone defined between mating abrasive surfaces of a rotor and a stator;
    concurrently, rotating the rotor relative to the stator and
    pressing the rotor and stator abrasive surfaces together with a high pressure such that the rotor and stator shear the liquid as well as the pellets, energy expended to rotate the rotor and stator is in part utilized to comminute the pellets to micron range particles, is in part wasted shearing the liquid, is in part utilized by the rotor and stator mating abrasive surfaces wearing each other away, and in part heats the liquid and micron range particles to at least 130° F.;
    separating the micron range particles and the heated liquid;
    mixing the separated, heated liquid with additional pellets to be comminuted to form additional, heated slurry which is pumped to the comminuting zone, the heated liquid having a lower viscosity than cooler liquid such that less energy is wasted shearing the liquid during the rotating and pressing step, whereby recirculating heated liquid improves energy efficiency of the comminuting method.

2. The comminuting method as set forth in claim 1 wherein the pellets include rubber and the fluid includes water.

3. The comminuting method as set forth in claim 2 wherein the rubber pellets are vulcanized.

4. The comminuting method as set forth in claim 2 wherein the entering water is heated to about a range of 80° F. to its boiling point.

5. A method of comminuting elastomers, the method comprising:
    forming a slurry by mixing a liquid and pellets of an elastomer which with increasing temperature becomes increasingly more sticky and viscous and requires increasingly more energy to comminute than at lower temperatures;
    feeding the slurry to a comminuting zone defined between a rotor and a stator;
    concurrently rotating the rotor relative to the stator and pressing the rotor and stator together with a sufficiently high pressure to comminute the elastomer pellets to fine, elastomeric particles, to shear the liquid, and to heat the liquid and the fine particles;
    separating the heated liquid and the fine elastomeric particles;
    recirculating heat from the separated, heated liquid to the mixing step to increase the temperature of the formed by liquid and elastomeric pellet slurry.

6. The method as set forth in claim 5 wherein the recirculating step includes mixing the separated, heated liquid with additional elastomeric pellets to make heated, additional slurry to be fed to the comminuting zone.

7. The comminuting method as set forth in claim 6 wherein the pellets include rubber.

8. The comminuting method as set forth in claim 7 wherein the fluid includes water.

9. The comminuting method as set forth in claim 8 wherein the rotor and stator are constructed of bonded abrasive grits in the range of pb 20 to 100 mesh.

* * * * *